United States Patent
Edlinger

(10) Patent No.: US 6,409,793 B1
(45) Date of Patent: Jun. 25, 2002

(54) METHOD FOR PROCESSING STEEL SLAGS CONTAINING CHROMIUM

(75) Inventor: Alfred Edlinger, Baden (CH)

(73) Assignee: "Holderbank" Financiere Glarus AG, Glarus (CH)

( * ) Notice: Subject to any disclaimer, the term of this patent is extended or adjusted under 35 U.S.C. 154(b) by 0 days.

(21) Appl. No.: 09/720,420

(22) PCT Filed: Apr. 14, 2000

(86) PCT No.: PCT/AT00/00088

§ 371 (c)(1),
(2), (4) Date: Dec. 22, 2000

(87) PCT Pub. No.: WO00/65108

PCT Pub. Date: Nov. 2, 2000

(30) Foreign Application Priority Data

Apr. 22, 1999 (AT) .............................................. 719/99

(51) Int. Cl.$^7$ ............................. C22B 7/04; C22B 34/32
(52) U.S. Cl. .......................... 75/10.35; 75/623; 75/629; 420/590
(58) Field of Search ....................... 75/623, 629, 10.35; 420/590

(56) References Cited

U.S. PATENT DOCUMENTS

| | | |
|---|---|---|
| 4,001,012 A | 1/1977 | Rote et al. |
| 4,588,436 A | 5/1986 | Eriksson et al. |
| 5,882,375 A * | 3/1999 | Edlinger et al. ............ 75/10.35 |
| 5,882,377 A * | 3/1999 | Aida et al. ..................... 75/623 |

FOREIGN PATENT DOCUMENTS

WO  WO 97/46717  12/1997

OTHER PUBLICATIONS

Database WPI. Week 200003, Derwent Publications, AN 2000–036664, XP002143440, "Blend for preparing high carbon ferrochrome", Jul. 20, 1998.
Patent Abstracts of Japan, vol. 011, No. 163 (C–424), May 26, 1987, JP 61 291911 A, Dec. 22, 1986.

* cited by examiner

*Primary Examiner*—Melvyn Andrews
(74) *Attorney, Agent, or Firm*—Kevin E. Joyce

(57) ABSTRACT

A method for processing steel slags and optionally iron carriers such as, e.g., electric furnace slags, converter slags, dusts derived from steel production, mill scale or secondary metallurgical residues, in which the molten steel slags or iron carriers are supplemented with chromium ores or chromium-containing and/or nickel-containing dusts in order to adjust a slag basicity of 1.2 to 1.6, whereby the bath temperature is maintained at above 1600° C., in particular between 1650° C. and 1800° C., and a carbon-containing iron bath is provided or formed. In addition to environmentally safe slags, a high-grade ferrochromium alloy may be recovered, thus enhancing the economy of the method.

18 Claims, No Drawings

METHOD FOR PROCESSING STEEL SLAGS CONTAINING CHROMIUM

This application is the national phase of international application PCT/AT00/00088 filed on Apr. 14, 2000 which designated the U.S., and that international application was not published under PCT article 21(2) in English.

BACKGROUND OF THE INVENTION

1. Field of the Invention

The invention relates to a method for processing steel slags and optionally iron carriers such as, e.g., electric furnace slags, coverter slags, dusts derived from steel production, mill scale or secondary metallurgical residues.

2. Prior Art

A method of the initially mentioned type is described, for instance, in WO 99/14381. In that known method, steel slags were reduced above in an iron bath along with iron carriers and, in particular, along with fine ore in order to thereby form environmentally safe slags. To this end, $SiO_2$ for adjusting a beneficial slag basicity or $Al_2O_3$ was also added among others, wherein the addition of iron carriers such as, for instance, fine ores in the first place served to appropriately use such starting materials which are difficult to process and which are difficult to reduce by conventional methods, in order to enhance the economy of the method. Due to the relatively poor thermal conductivity of slags and a heat capacity that is 1.5 to 2 times larger than that of iron, the heat transfer and degree of postcombustion to be attained are of essential importance to the economy of such a method. In any event, relatively high energy expenditures will have to be taken into account regarding that type of processing of steel slags aimed to produce environmentally safe slags.

SUMMARY OF THE INVENTION

The invention aims to improve a method of the initially defined type with a view to enabling, simultaneously with the processing of slags, the recovery of valuable raw materials which will guarantee the economy of the method despite the elevated consumption of energy involved. To solve this object, the process according to the invention essentially consists in that the molten steel slags and iron carriers, respectively, are supplemented with chromium ores or chromium-containing and/or nickel-containing dusts in order to adjust a slag basicity of 1.2 to 1.6, whereby the bath temperature is maintained at above 1600° C., in particular between 1650° C. and 1800° C., and a carbon-containing iron bath is provided or formed, and that the slag and the ferrochromium alloy formed are tapped separately. It is true that the use of chromium ores or chromium-containing and/or nickel-containing dusts basically involves the risk of an excessive chromium oxide content within the slag, which might again seriously jeopardize the environmental safety of the thus processed steel slags. Yet, by working at bath temperatures of above 1600° C., it has surprisingly become feasible to reach final chromium contents in the slag of far below 500 ppm and, at the same time, transform chromium from such chromium ores nearly quantitatively into the iron bath used for reduction. The activity of the chromium within the iron bath is considerably reduced by the formation of chromium carbide, to which end an iron bath having an accordingly high carbon content must be provided or formed. In this context, the carbon content of the iron bath, as a rule, must be kept at above 3 wt.-% C in order to ensure that the desired chromium carbide formation will be effected so as to avoid reslagging of the reduced chromium oxide. Final chromium concentrations of a carbon-containing iron bath provided in such a manner may comprise up to 60 wt.-% chromium, thus enabling a high-grade metal regulus in the form of socalled ferrochromium carburé, in which the portion of carbon may amount up to 9 wt.-%. Due to that high-grade metal regulus, the economy of such a mode of procedure will be safeguarded despite the high temperature level required, whereby the thus formed pre-alloy, which may be used in the special steel plant, covers the overall energy costs and production costs of the slags that have thus become environmentally safer.

What is essential to the process according to the invention is the high temperature level of above 1600° C., which will be ensured by a suitable postcombustion only. In addition, an accordingly rapid mass transfer must be ensured. Such conditions advantageously can be observed in that the chromium ores or chromium-containing and/or nickel-containing dusts are top-blown onto the bath via a hot blast lance at particle sizes of below 4 mm, preferably 0.5 to 2 mm. By blowing in the chromium ores at such particle sizes by the aid of a jet of a suitable speed, high turbulences will form, thus subjecting the bath to intensive agitation. The large relative surface implied by the particle size and the high shearing forces acting between the individual phases and, in particular, between the gas phases, the chromium ores, the slag melt and the metal melt result in accordingly high energy and mass transfer rates. The temperature level required in a simple manner may be ensured in that hot blast at temperatures of between 1200° and 1600° C. is used.

In order to ensure an appropriate postcombustion, the hot blast advantageously is enriched with oxygen to an oxygen content of 25 to 40 wt.-%, early incipient solidifying of the slag by the progressing reduction procedure advantageously being feasible by mixing the steel slags with the chromium ore in a suitable mixing vessel. In such a mixing vessel, the respective basicity and the mixed slag temperature may be adjusted, whereby the slag mixture may be tapped at temperatures of, for instance, about 1750° C. and supplied to the consecutively arranged reduction unit. At those high slag input temperatures prevailing within the reduction converter, oxygen enrichment of the hot air jet may even be obviated at all.

Advantageously, it is proceeded in a manner that the molten steel slag and the chromium ores are mixed in a slag ladle and are electrically heated using, in particular, graphite electrodes and applied onto the iron bath at temperatures of above 1700° C., preferably above 1750° C., whereupon the iron bath is carburized and hot blast is top-blown. The iron bath in this case is to be present in a low-carbon form refined by hot blast in order to reduce the initial reduction speed, with high bath temperatures being safeguarded at the same time. Departing from carbon contents of, for instance, 0.8 to 1.5 wt.-% C within the iron bath, the carbon content required for the quantitative separation of chromium will be adjusted only subsequently by carburizing the bath.

In order to attain a particularly high environmental safety of the treated steel slag, the basicity advantageously is adjusted to 1.4 to 1.55.

An accordingly reliable mixing of the bath is feasible in a particularly simple manner in that the hot blast with the chromium ores or chromium-containing and/or nickel-containing dusts is directed onto the bath at jet speeds of more than 500 m/s and, in particular, 700 m/s.

In the context of the method according to the invention, special steel slags are preferably used as steel slags, yet also LD slags, OBM slags and electric furnace slags as well as secondary metallurgical residues may be envisaged as charging materials. Chromium ores may at least partially be replaced with dusts highly loaded with chromium and nickel, the introduction of phosphorus having to be minimized in any event.

In the main, the method according to the invention, in which carbon contents of up to 9 wt.-% may be obtained within the bath, offers the advantage that any reslagging of chromium within the slag can be largely excluded, residual chromium oxide contents of less than 360 ppm having been observed within the slag at temperatures of 1650° C.

DETAILED DESCRIPTION OF A PREFERRED EMBODIMENT OF THE INVENTION

In the following, the invention will be explained in more detail by way of an exemplary embodiment. Steel slag having the following composition:

| Steel slag | |
|---|---|
| Component | Portion (%) |
| CaO | 52 |
| $SiO_2$ | 31 |
| $Al_2O_3$ | 3 |
| FeO | 4.5 |
| $Cr_2O_3$ | 9 |
| $CaO/SiO2 = 1.67$ | | was supplemented with chromium ore of the following composition:

| Chromium ore (Transvaal) | |
|---|---|
| Component | Portion (%) |
| $Cr_2O_3$ | 44.4 |
| FeO | 25.05 |
| $SiO_2$ | 8.2 |
| MgO | 5.3 |
| $Al_2O_3$ | 16.62 | until a target basicity of approximately 1.5 had been reached. Chromium ores, as a rule, are acidic such that the respective basicity can be adjusted by the addition of chromium ores.

The chromium ore was top-blown onto the melt by means of a hot gas lance with the ore conveying rate having been determined as the speed-determining step. The reduction itself proceeded within seconds and was merely dependent on the dissolution kinetics and hence the particle size of the chromium ores. Chromium ore having a particle size of 0.5 to 2 mm was used, 1 part by weight of steel slag having been bombarded with 0.442, part by weight of chromium ore in order to attain the target basicity of approximately 1.5 ($CaO/SiO_2$). The mixed slag obtained was composed of 69.35 wt.-% steel slag and 30.65 wt.-% chromium ore and had the following composition:

| Mixed slag | |
|---|---|
| Component | Portion (%) |
| CaO | 36 |
| $SiO_2$ | 24 |
| $Al_2O_3$ | 7.2 |
| FeO | 10.8 |
| $Cr_2O_3$ | 19.85 |
| MgO | 1.63 |
| $CaO/SiO_2 = 1.5$ | |

This mixed slag was continuously charged onto a carbon-containing iron bath and reduced, whereupon a slag having the following composition:

| Component | Portion (%) |
|---|---|
| CaO | 52.3 |
| $SiO_2$ | 34.8 |
| $Al_2O_3$ | 10.5 |
| MgO | 2.4 | was obtained. From 1 ton of mixed slag was formed 0.688 ton of such a target slag. At the same time, a high-grade metal regulus having the following composition:

| | |
|---|---|
| Fe | 35% |
| Cr | 55% |
| C | 8% | was formed. Such a ferrochromium carbure could subsequently be used directly as a pre-alloy in a special steelworks.

In order to maintain the necessary slag treatment temperature of above 1600° C., it has proved to be advantageous to add coal dust and coal to the hot blast jet. In this manner, the energy balance can be economically improved by very cheap thermal coal, but also by the addition of heavy oil or natural gas.

What is claimed is:

1. A method for processing a molten bath of steel slags containing chromium, characterized in that the molten steel slags containing chromium are supplemented with chromium ores or chromium-containing and/or nickel-containing dusts in order to produce a mixed slag having a slag basicity of 1.2 to 1.6, maintaining temperature of the bath above 1600° C., introducing the mixed slag into a carbon-containing iron bath to form a mix containing a ferrochromium alloy, and separately tapping the ferrochromium alloy from the mix.

2. A method according to claim 1, characterized in that the chromium ores or chromium-containing and/or nickel-containing dusts are top blown onto the bath via a hot blast lance at particle sizes of below 4 mm.

3. A method according to claim 2, characterized in that a hot blast top-blown from the lance is at temperatures of between 1200° C. and 1600° C.

4. A method according to claim 3, characterized in that the hot blast is enriched with oxygen to an oxygen content of 25 to 40 wt.-%.

5. A method according to any one of claims 1 to 4, characterized in that the basicity is adjusted to 1.4 to 1.55.

6. A method according to claim 3 or 4, characterized in that the hot blast with the chromium ores or chromium-containing and/or nickel-containing dusts is directed onto the bath at jet speeds of more than 500 m/s.

7. A method according to any one of claims 1 to 4, characterized in that the carbon content of the iron bath is kept at above 3 wt.-% C.

8. A method according to any one of the claims 1 to 4, characterized in that the molten steel slag and the chromium ores are mixed in a slag ladle and are electrically heated using graphite electrodes and are applied onto the iron bath at temperatures above 1700° C. whereupon the iron bath is carburized and hot blast is top-blown.

9. A method according to claim 5, characterized in that the hot blast with the chromium ores or chromium-containing and/or nickel-containing dusts is directed onto the bath at jet speeds of more than 500 m/s.

10. A method according to claim 5, characterized in that the carbon content of the iron bath is kept at above 3 wt.-% C.

11. A method according to claim 6, characterized in that the carbon content of the iron bath is kept at above 3 wt.-% C.

12. A method according to claim 5, characterized in that the molten steel slag and the chromium ores are mixed in a slag ladle and are electrically heated using graphite electrodes and are applied onto the iron bath at temperatures above 1700° C. whereupon the iron bath is carburized and hot blast is top-blown.

13. A method according to claim 6, characterized in that the molten steel slag and the chromium ores are mixed in a slag ladle and are electrically heated using graphite electrodes and are applied onto the iron bath at temperatures above 1700° C. whereupon the iron bath is carburized and hot blast is top-blown.

14. A method according to claim 7, characterized in that the molten steel slag and the chromium ores are mixed in a slag ladle and are electrically heated using graphite electrodes and are applied onto the iron bath at temperatures above 1700° C. whereupon the iron bath is carburized and hot blast is top-blown.

15. A method according to claim 1, characterized in that the molten bath further includes iron carriers.

16. A method according to claim 1, characterized in that said iron carriers are selected from a group consisting of electric furnace slags, converter slags, dusts derived from steel production, mill scale and metallurgical residues.

17. A method according to claim 1, characterized in that the temperature of the bath is maintained between 1650° C. and 1800° C.

18. A method according to claim 2, wherein the particle sizes are between 0.5 and 2 mm.

\* \* \* \* \*